United States Patent
Kim et al.

(10) Patent No.: US 10,771,579 B2
(45) Date of Patent: Sep. 8, 2020

(54) REDIRECTION OF DATA FLOWS FROM AN END DEVICE

(71) Applicant: Verizon Patent and Licensing Inc., Arlington, VA (US)

(72) Inventors: Beomjun Kim, Waltham, MA (US); Jae Won Chung, Lexington, MA (US); Jian Huang, Sudbury, MA (US); Parth Modi, Naperville, IL (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 200 days.

(21) Appl. No.: 15/714,233

(22) Filed: Sep. 25, 2017

(65) Prior Publication Data

US 2019/0098105 A1    Mar. 28, 2019

(51) Int. Cl.
*H04L 29/08*    (2006.01)

(52) U.S. Cl.
CPC .......... *H04L 67/2814* (2013.01); *H04L 67/02* (2013.01); *H04L 67/141* (2013.01)

(58) Field of Classification Search
CPC .... H04L 67/2814; H04L 67/02; H04L 67/141
See application file for complete search history.

(56) References Cited

U.S. PATENT DOCUMENTS

| | | | |
|---|---|---|---|
| 8,856,869 B1 * | 10/2014 | Brinskelle | G06F 21/6218 726/2 |
| 9,288,225 B1 * | 3/2016 | Fei | H04L 63/1441 |
| 2007/0191033 A1 * | 8/2007 | Marais | H04L 67/14 455/466 |
| 2009/0249131 A1 * | 10/2009 | Mitomo | H04M 3/51 714/48 |
| 2013/0036451 A1 * | 2/2013 | Fausak | |
| 2014/0331297 A1 * | 11/2014 | Innes | |
| 2015/0095777 A1 * | 4/2015 | Lim | |
| 2015/0128105 A1 * | 5/2015 | Sethi | |

* cited by examiner

*Primary Examiner* — Benjamin M Thieu

(57) ABSTRACT

A method, a device, and a non-transitory storage medium are described in which a connection service is provided based on a software development kit architecture for an end device that operates with an Android operating system. The connection service includes a library that, when called, sets-up a Hypertext Transfer Protocol connection between the end device and a proxy device using a function pointer and a portable operating system interface connect function. The connection service also generates and transmits a Hypertext Transfer Protocol CONNECT message, which includes a Proxy-Authorization header, to the proxy device, which triggers three-way handshaking between the proxy device and a target device, subsequent to an establishment of the connection with the proxy device.

20 Claims, 15 Drawing Sheets

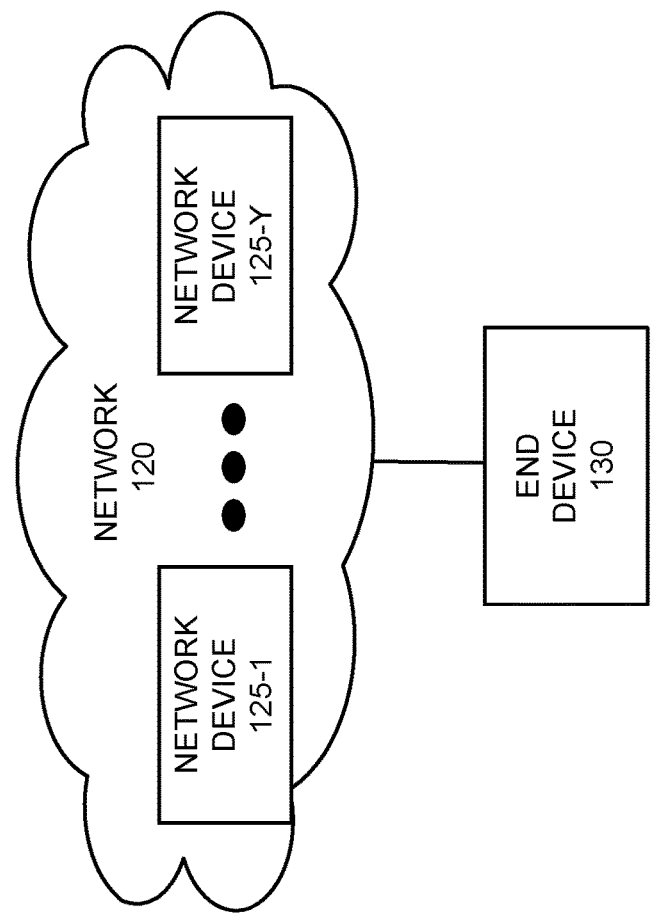

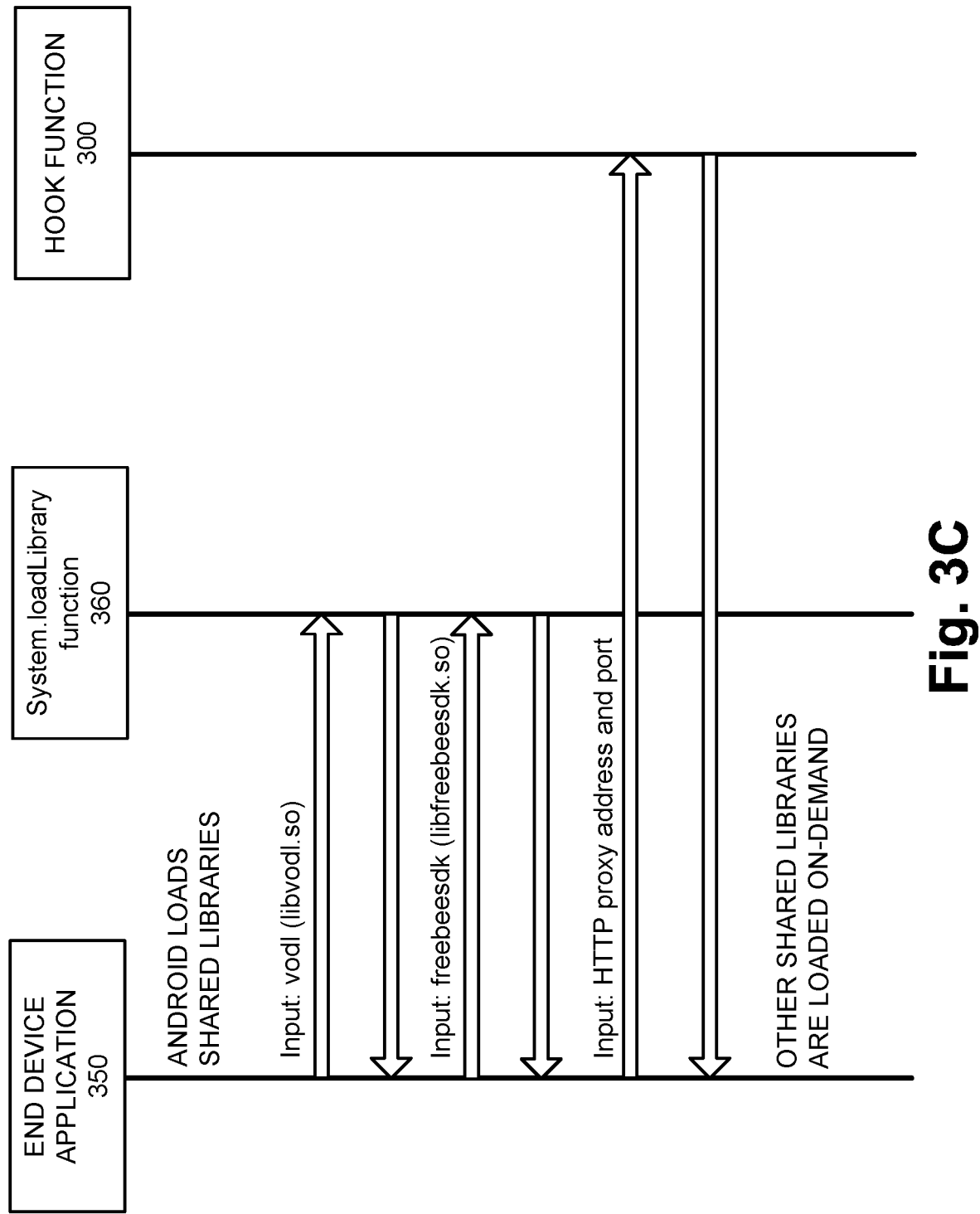

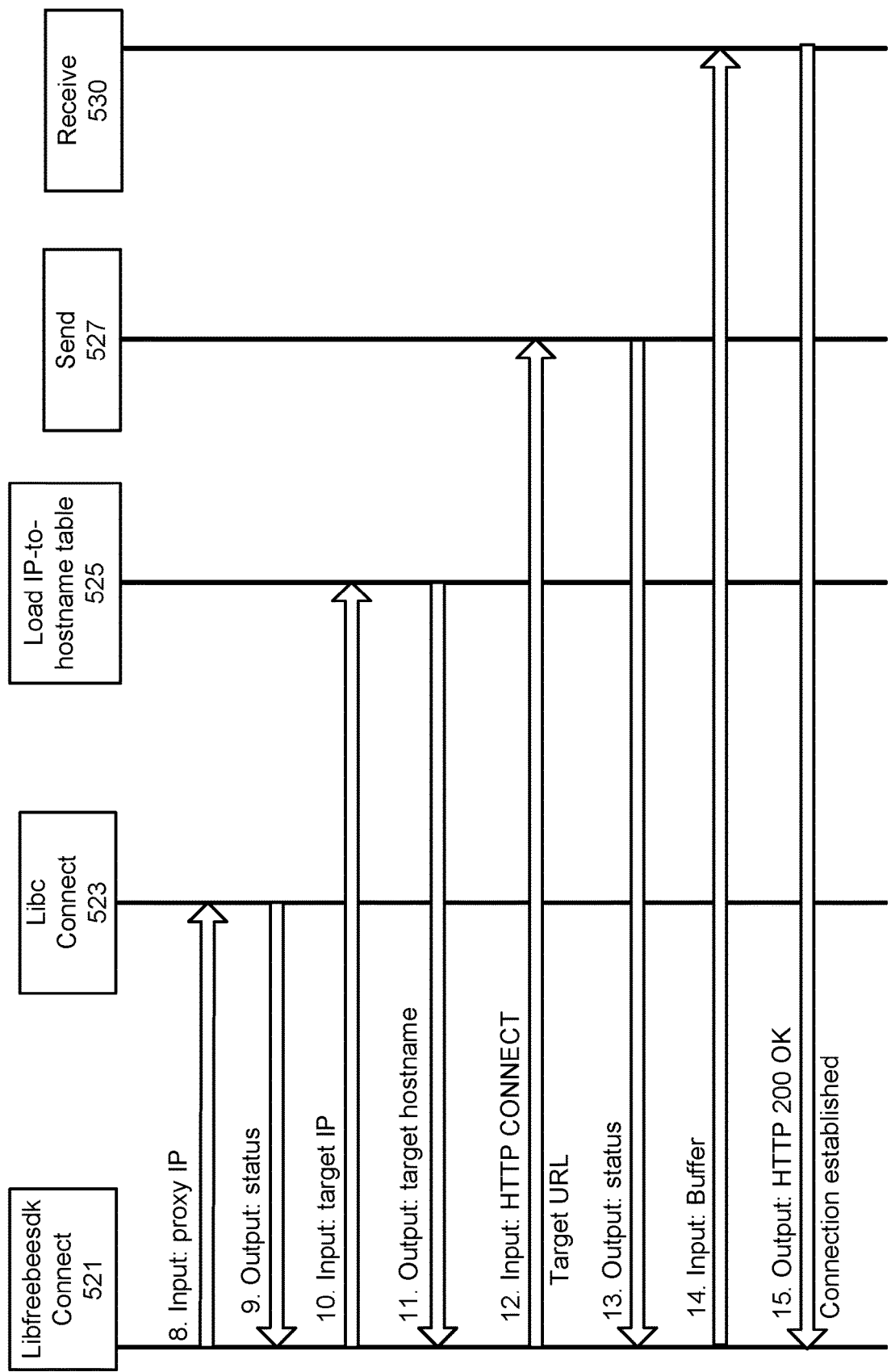

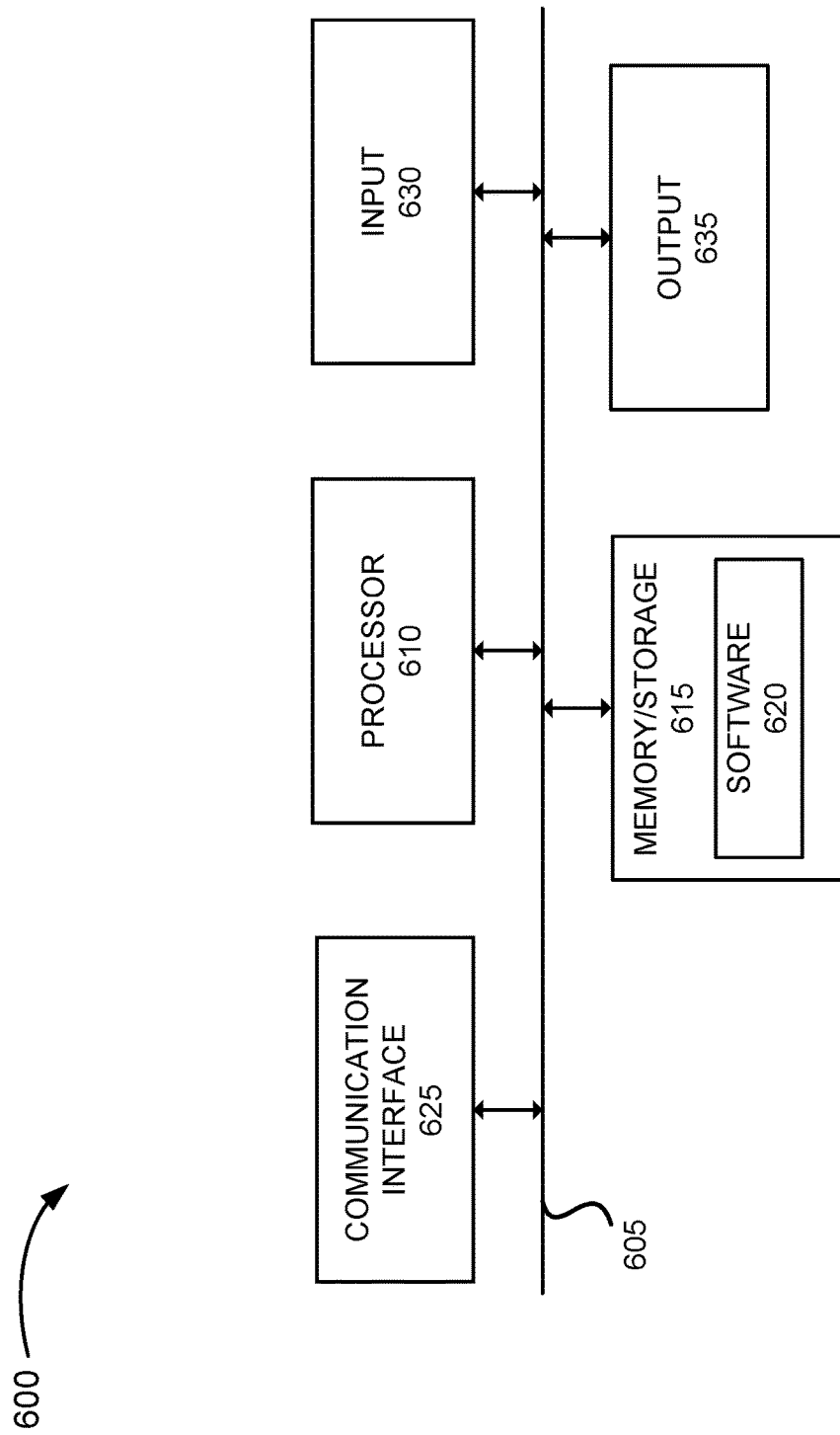

REDIRECTION OF DATA FLOWS FROM AN END DEVICE

BACKGROUND

Depending on the operating system (OS) of an end device, various types of developmental tools may be used to create an application. For example, with reference to the Android OS, applications may be developed using a Software Development Kit (SDK) or other form of development environment.

BRIEF DESCRIPTION OF THE DRAWINGS

FIG. 1 is a diagram illustrating an exemplary environment in which an exemplary embodiment of a connection service may be implemented;

FIGS. 3A-3C are diagrams illustrating an exemplary process of the connection service;

FIGS. 5A-5D are diagrams illustrating another exemplary process of an exemplary embodiment of the connection service;

FIG. 6 is a diagram illustrating exemplary components of a device that may correspond to one or more of the devices illustrated herein;

DETAILED DESCRIPTION OF PREFERRED EMBODIMENTS

Figure 2A:
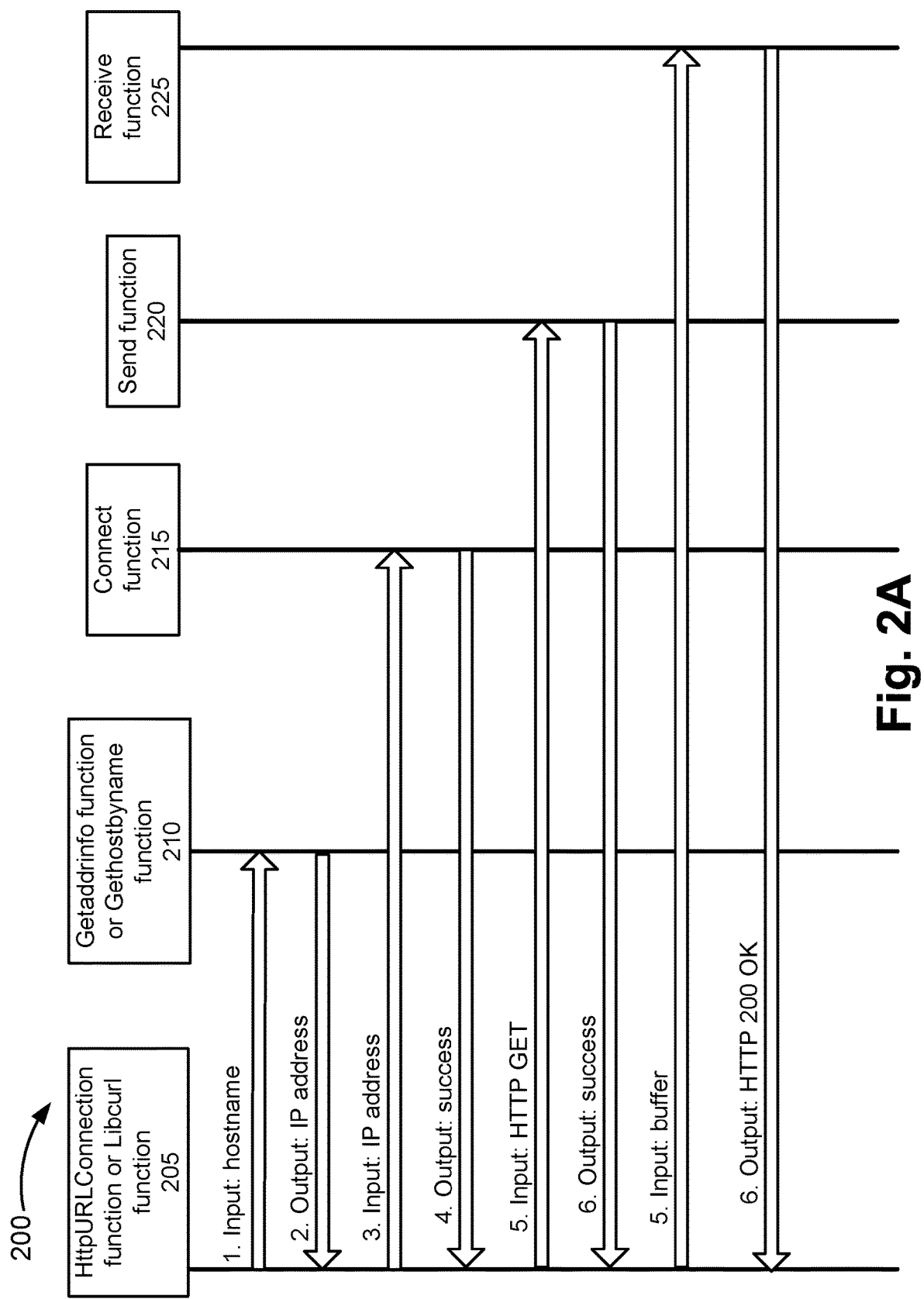
FIGS. 2A and 2B are diagrams illustrating an exemplary process for establishing a connection.

The following detailed description refers to the accompanying drawings. The same reference numbers in different drawings may identify the same or similar elements. Also, the following detailed description does not limit the invention.

Various development environments, within which applications may be developed for various operating systems, may each include a set of developmental tools. For example, an SDK for Android may include various tools, such as a debugger, libraries (e.g., C/C++, Java, etc.), an emulator, and so forth. The library may include a set of functions that may be used to perform various tasks in support of the application under development. For example, an application may use various available library functions to setup a communication session between an end device and a network device.

Unfortunately, the available library functions may limit a desired functionality for the application and/or a service under development. For example, on an Android end device, a user (e.g., an end user, an application developer, etc.) may set a Hypertext Transport Protocol (HTTP) proxy server address and port number under a wireless setting (e.g., WiFi, etc.) for one or multiple applications. In view of these settings and the available library functions, when the application uses the HTTP protocol to communicate with the HTTP proxy server, the application sends an HTTP GET message even though the application should send an HTTP CONNECT message. Also, the application, when using the HTTP protocol to communicate with the HTTP proxy server, does not add a Proxy-Authorization header. In this regard, the library functions offered by shared libraries for the Android OS may not allow the developer to properly configure the application under development. Additionally, a user of the end device may not have access to a service offered by the HTTP proxy server because the application cannot be correctly configured to establish a connection with the HTTP proxy server.

According to exemplary embodiments, a connection service that is based on an SDK architecture is described. According to an exemplary embodiment, the SDK architecture includes an SDK for the Android OS. According to an exemplary embodiment, the SDK directs all Transmission Control Protocol (TCP) traffic from an application of an end device to a proxy device (e.g., an HTTP proxy server) when the application uses the HTTP protocol.

According to an exemplary embodiment, the SDK includes a library. According to an exemplary embodiment, the SDK includes a modified connect function, and a function pointer, which may store a Portable Operating System Interface (POSIX) connect function after the initialization. According to an exemplary embodiment, the SDK locates the address of the POSIX connect function, which may be stored in a virtual memory area (VMA), and replaces the address of the POSIX connect function with an address of the modified connect function. In turn, the SDK stores the address of the POSIX connect function with the function pointer. The modified connect function may call the POSIX connect function by using the function pointer that stores the address of the POSIX connect function. The phrase "modified connect function," as used herein, is merely an exemplary nomenclature for the function.

When the application is invoked to establish a connection with a target device using the HTTP protocol, the modified connect function may be called, instead of the POSIX connect function. The modified connect function may, in response to the invocation, provide an input (e.g., an Internet Protocol (IP) address of the proxy device) and call the POSIX connect function to establish the connection with a proxy device. Subsequent to a successful establishment of a connection between the end device and the proxy device, the modified connect function may generate an HTTP CONNECT message and a Proxy-Authorization header. The modified connect function may call a send function so that the application may transmit the HTTP CONNECT message to the target device via the proxy device.

As a result, the connection service improves the development of applications for end devices that operate using the Android OS by allowing developers to use the SDK, as described herein, and the HTTP protocol when proxy services are used by the applications. Additionally, applications of the end devices may be configured to establish a connection with target devices via proxy devices using the HTTP protocol, and receive the proxy services.

FIG. 1 is a diagram illustrating an exemplary environment 100 in which an exemplary embodiment of a connection service may be implemented. As illustrated, environment 100 includes a network 120. Network 120 includes network devices 125-1 through 125-Y (also referred to collectively as network devices 125 and, individually, or generally as network device 125). Environment 100 also includes an end device 130. According to other embodiments, environment 100 may include additional, fewer, and/or different networks than those described herein.

Environment 100 includes a communication link between network 120 and end device 130. Although not illustrated, environment 100 may include a communication link between network devices 125. Environment 100 may be implemented to include a wired, an optical, and/or a wireless communication link. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device). The number and the type of devices illustrated in environment 100 are exemplary.

Network 120 may include one or multiple networks of one or multiple types. For example, although not illustrated, network 120 may be implemented to include, for example, an access network, a core network, and an application layer or service network. For example, the access network may be implemented to include a radio access network (RAN), a wired network, and/or an optical network. The core network may be implemented to include, for example, a complementary network pertaining to the access network. The application layer or service network may be implemented to include the Internet, the World Wide Web, an Internet Protocol Multimedia Subsystem (IMS) network, a Rich Communication Service (RCS) network, a cloud network, a packet-switched network, a private network, a public network, a telecommunication network, an Internet Protocol (IP) network, or some combination thereof.

Depending on the implementation of network 120, network 120 may include various network devices 125 that provide various network-related functions and/or services, such as charging and billing, security, authentication and authorization, network policy enforcement, management of subscriber profiles, and/or other functions and/or services that facilitate the operation of network 120. According to an exemplary embodiment, one or multiple network devices 125 of network 120 include an HTTP proxy server. The HTTP proxy server may be configured to provide a service on behalf of end device 130 and/or a user of end device 130 (not illustrated). For example, the HTTP proxy server may provide a charging service for sponsored data, an encryption service, an anonymity service, or some other type of service (e.g., a data filtering service, etc.). Network devices 125 of network 120 may include an HTTP server or other type of application layer server (e.g., an email server, etc.) that can be accessed via the HTTP proxy server.

End device 130 includes a device that has computational and communication capabilities. End device 130 may be implemented as a mobile device, a portable device, or a stationary device. For example, end device 130 may be implemented as a smartphone, a personal digital assistant, a tablet, a netbook, a phablet, a wearable device, a computer, a machine-to-machine device, or an Internet of Things (IoT) device. According to an exemplary embodiment, end device 130 includes an Android OS. According to an exemplary embodiment, end device 130 includes logic that provides a connection service, as described herein. According to various exemplary embodiments, end device 130 may be configured to execute various types of software (e.g., applications, programs, etc.). The number and the types of software may vary from one end device 130 to another end device 130.

Figure 2B:
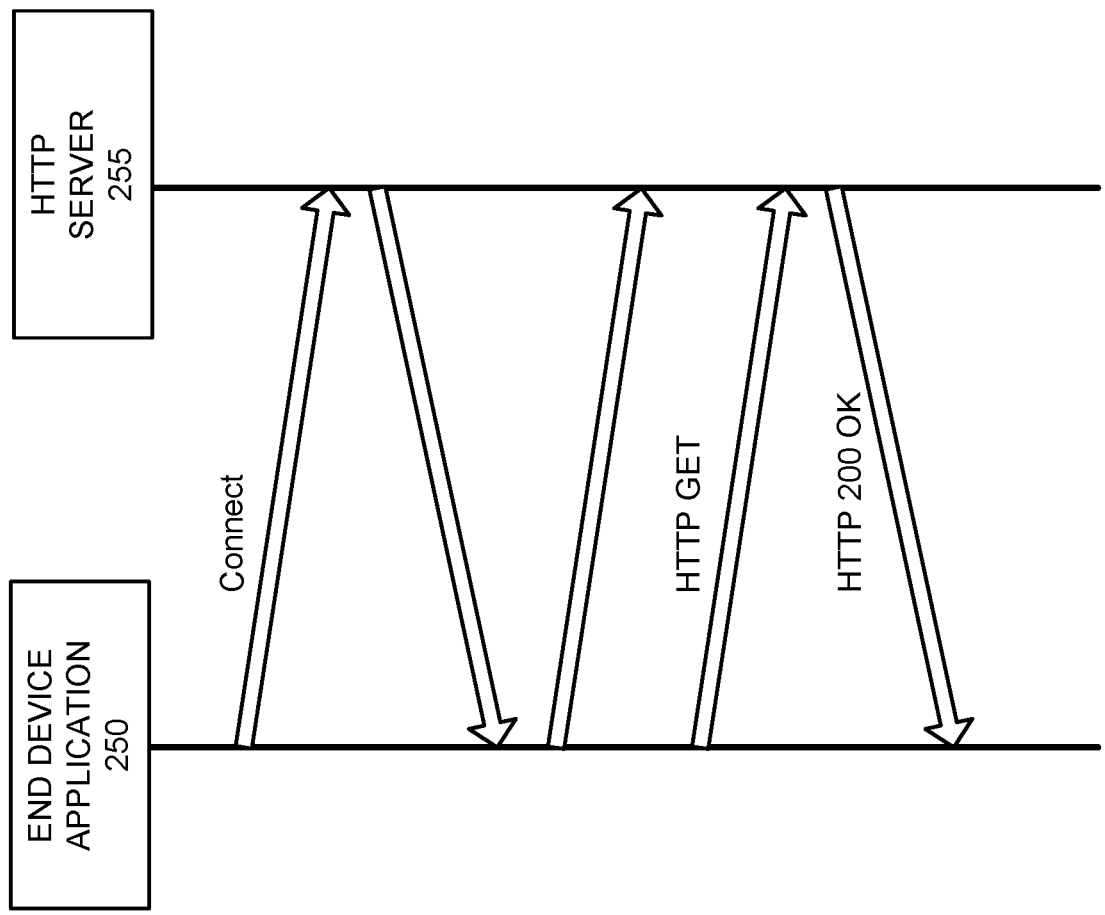

An end device, which includes an Android OS, may use various functions associated with a shared library. For example, as previously described, an SDK may include a library of functions to establish a connection between the end device and an HTTP server. Referring to FIG. 2A, in step (1), an HttpURLConnection class or a Libcurl function 205 may receive an input (e.g., a hostname) via an application of the end device. For example, the HttpURLConnection class may include functions as a part of a Java Development Kit (JDK), and the Libcurl function may be a function of the libcurl library implemented with a C/C++ language. The HttpURLConnection class or the Libcurl function 205 may provide the input (e.g., the hostname) to a getaddrinfo function or a gethostbyname function 210. In step (2), the getaddrinfo function or the gethostbyname function 210 may provide an output (e.g., an IP address associated with the hostname) to the HttpURLConnection class or the Libcurl function 205. In step (3), the HttpURLConnection class or the Libcurl function 205 provides an input (e.g., the IP address of the hostname) to a connect function 215 (e.g., the POSIX connect function). In step (4), the connect function 215 provides an output (e.g., an acknowledgement or a success) to the HttpURLConnection class or the Libcurl function 205. For example, the connect function 215 may perform a three-way handshake procedure between the application of the end device and a server (e.g., an HTTP server). In step (5), the HttpURLConnection class or the Libcurl function 205 may provide an input (e.g., an HTTP GET message) to a send function 220, which is to transmit the HTTP GET message to the server. In step (6), the send function 220 provides an output (e.g., an acknowledgement or a success) to the HttpURLConnection class or the Libcurl function 205. In step (6), the HttpURLConnection class or the Libcurl function 205 may provide an input (e.g., buffer), in response to the success, to a receive function 225, so that an HTTP 200 OK message may be received from the server. FIG. 2B is a diagram illustrating the three-way handshake messages, the HTTP GET message, and the HTTP 200 OK message that may be exchanged between an end device application 250 and an HTTP server 255, as previously described in relation to FIG. 2A.

However, as previously described, when the application uses the HTTP protocol to communicate with an HTTP proxy server, the application sends an HTTP GET message even though the application should send an HTTP CONNECT message in view of the library functions currently available. Also, the application, when using the HTTP protocol to communicate with the HTTP proxy server, does not add a Proxy-Authorization header.

Figure 3A:
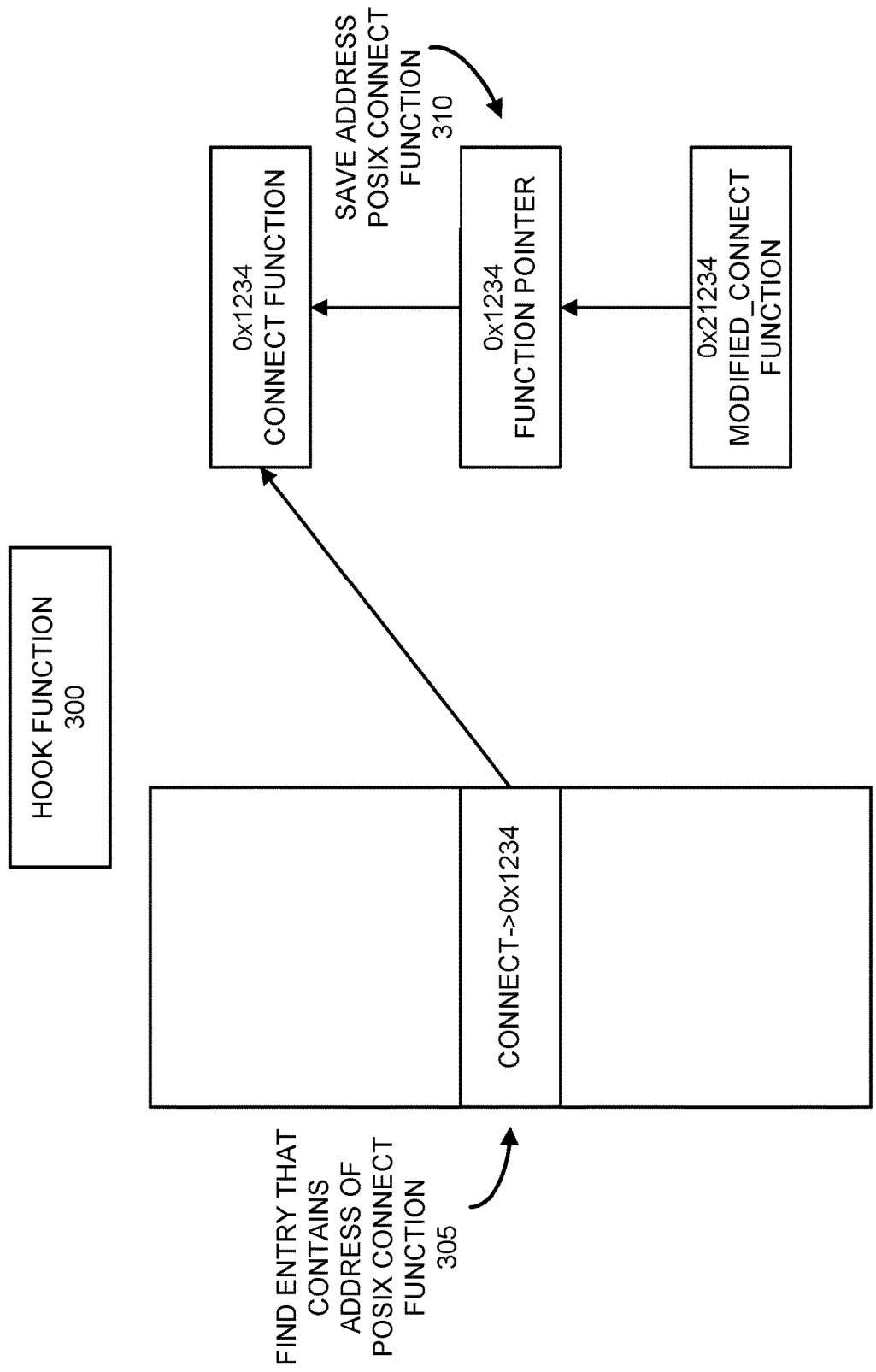
Figure 3B:
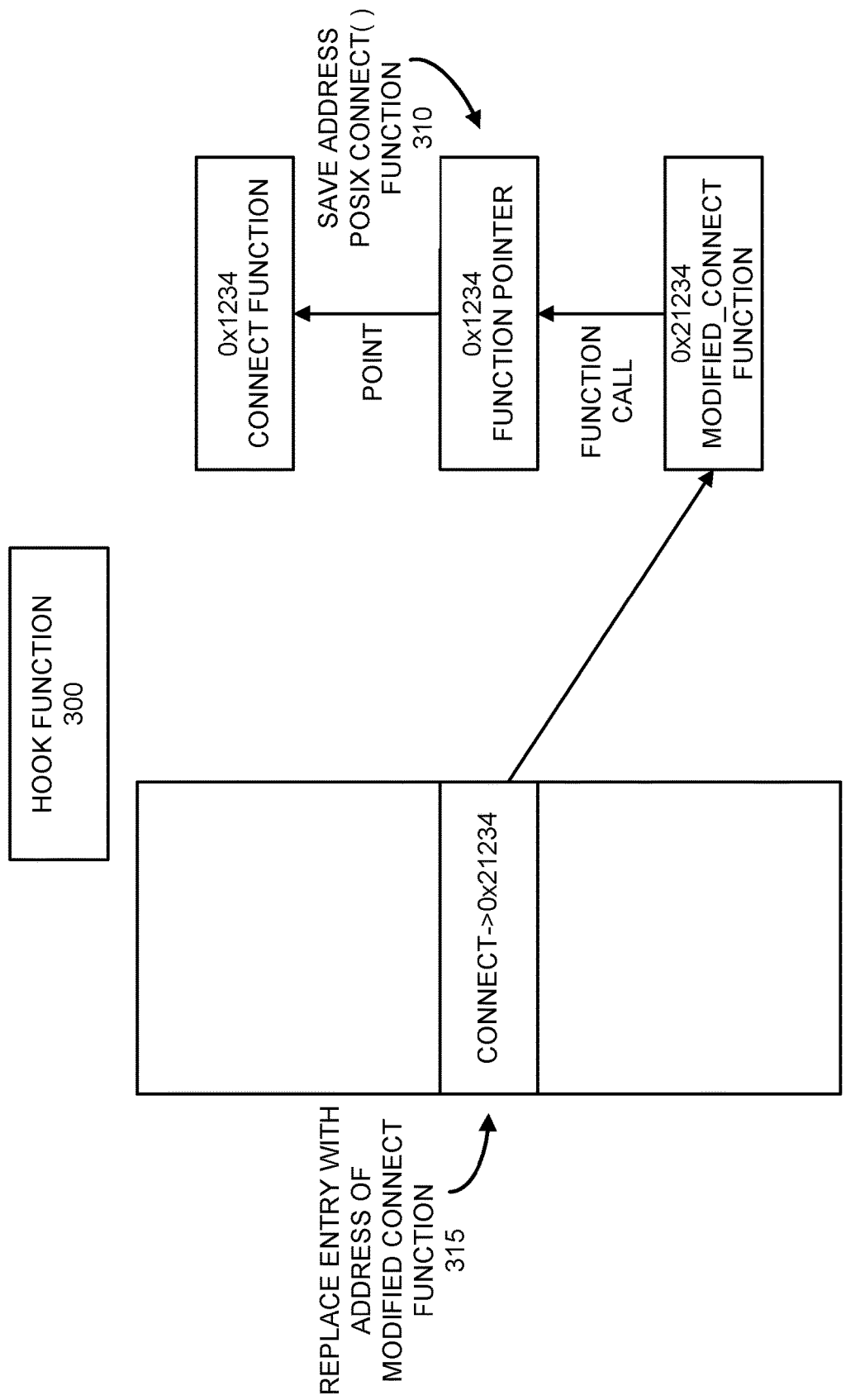

FIGS. 3A and 3B are diagrams illustrating an exemplary process of the connection service. According to an exemplary embodiment, the connection service includes a hook service. For example, the library may include a hook function that performs the operations illustrated and described in relation to FIGS. 3A and 3B. Referring to FIG. 3A, a hook function 300 of end device 130 includes logic that provides a hook service, which is included in the connection service, as described herein. For example, hook function 300 finds an address of the POSIX connect function (305). For example, hook function 300 may search a VMA in which a shared library, which includes the POSIX connect function, is loaded. According to an exemplary implementation, hook function 300 may read a maps file that includes a starting address and an ending address of the VMA to which the shared library is mapped. The VMA may include an Executable and Linkable Format (ELF) header, where there is a pointer to program headers. The program headers may include an address for a dynamic section header. The dynamic section may include addresses for sections, such as a .rel.plt (e.g., a Procedure Linkage Table) and/or a rel.dyn (e.g., a Relocation Table (RT)). An entry in the PLT has the address to an entry in a Global Offset Table ((GOT), .got.plt), and an entry in the RT has the address to an entry in the GOT (.got). The entry of the RT may be resolved when a shared library is loaded, while the resolution of the entry in the PLT can be deferred. For the purpose of replacing the address of the connect function (e.g., the POSIX connect function) in the GOTs (e.g., .got and .got.plt sections), hook function 300 may find the entry in the GOT that stores the address of the POSIX connect function.

As further illustrated, hook function 300 may save the address of the POSIX connect function (310) with a function pointer. For example, hook function 300 may identify the address of the function pointer in the GOT. Referring to FIG. 3B, hook function 300 may replace the entry, which previously stored the address of the POSIX connect function, with the address of a modified connect function (315). For example, hook function 300 may identify the address of the modified connect function in the GOT, and write the address of the modified connect function to the memory location. In this way, when the connect function is called, the GOT may store the address of the modified connect function. The modified connect function may include logic that calls the function pointer, which in turn, may call the connect function (e.g., the POSIX function) to establish a connection between end device 130 and the HTTP proxy server.

When a connection is to be established between an application of end device 130 and the HTTP proxy server, the modified connect function, instead of the connect function, is called. In response, the modified connect function may call the connect function via the function pointer to establish the connection. In response to successfully establishing the connection, the modified connect function may generate an HTTP CONNECT message. The HTTP CONNECT message may include a Proxy-Authorization header, which may include credentials and/or authorization information for end device 130, the application of end device 130, and/or a user of end device 130. In this way, the HTTP CONNECT message with the Proxy-Authorization header may be transmitted to the HTTP proxy server. The HTTP CONNECT message may include the IP address of the HTTP proxy server and the IP address of the target server (e.g., the HTTP server). The modified connect function may call a send function to transmit the HTTP CONNECT message to the target server via the HTTP proxy server. This process may be performed in a blocking mode whether the socket file descriptor is non-blocking or not.

Additionally, although not illustrated, hook function 300 may include logic that provides the hook service in relation to the getaddrinfo function and the getnameinfo function. For example, the HTTP CONNECT message may include the hostname of the target server, instead of or in addition to the IP address of the target server. Given that the connect function (e.g., the POSIX connect function) may receive the IP address, an IP address-to-hostname mapping may be stored. By way of further example, according to an exemplary embodiment of the connection service, when a Libcurl function or an HttpURLConnection class calls a getaddrinfo function or gethostbyname function included in a library, the library/functions may store the IP address and the hostname. After a connection is established with an HTTP proxy device, the modified connect function transmits the HTTP CONNECT message, which includes, for example, a Uniform Resource Identifier (URI) of a target server that may be obtained from the stored IP address and hostname, and may call a receive function to receive an HTTP 200 Connection Established message, when the connection is successful.

A Dalvik (e.g., a virtual machine that executes applications written for Android) or an Android Runtime Virtual Machine (ART VM) does not load a shared library until it needs it. This may be determined by, for example, a System.loadLibrary function, which is included in the Java built-in library. The System.loadLibrary function calls a dlopen function (e.g., the android_dlopen_ext function above the Android 5.0 Lollipop) implemented in the /system/bin/linker. In this regard, these functions may also be subject to the hook service provided by hook function 300.

Referring to FIG. 3C, depending on the end device application, the end device application may or may not include a library that has its own implementation of the dlopen function. However, when the end device application includes such a library, the library may be preloaded, and the dlopen function of the library may also be hooked when the module is running below the Android 4.4 Kitkat. If the module runs above the Android 5.0 Lollipop, the dlopen function in the shared library from the end device application that the module resides may also be hooked, in addition to hooking the android_dlopen_ext function because the dlopen function implemented in the shared library may not call the android_dlopen_ext function. So after an Android application preloads the shared libraries that it is using, the shared library (libfreebeesdk.so file) which contains the HOOK function 300 needs to be loaded. It is done by the initialization function that this library (Android Achieve) provides to the user. The initialization function loads the shared library using System.loadLibrary function and provides the HTTP proxy address and port to the HOOK function 300.

Exemplary coding for an exemplary embodiment of the hooking service is illustrated below.

```
int       close (int);
int       connect (int, const struct sockaddr *, socklen_t);
struct    *gesthostbyname (const char *);
hostent
int       free addrinfo (struct addinfo *);
struct    *gethostbyaddr (const void *, socklen_t, int);
hostent
int       getaddrinfo (const char *, const char *, const struct addrinfo
          *, struct addrinfo **);
int       android_getaddrinfofornet (const char *hostname, const
          char *servname, const struct addrinfo *hints, unsigned
          netid, unsigned mark, struct addrinfo **res);
int       getnameinfo (const struct sockaddr *, socklen_t, char *,
          socklen_t, char *, socklen_t, int);
ssize_t   sendto (int, const void *, size_t, int, const struct sockaddr *,
          socklen_t);
int       sendmsg (int, const struct msghdr *, int);
ssize_t   recvfrom (int fd, void *buf, size_t len, int flags, const
          struct sockaddr * src_addr, socklen_t *addr_len);
void*     dlopen (const char*, int);
void*     android_dlopen_ext (const char*, int, const void*); // If
          library is running above the Android 5.0 Lollipop
void*     dlsym (void*, const char*);
```

With reference to the exemplary code above, the android_getaddrinfofornet function is hooked because the Java layer in the Android OS calls the POSIX getaddrinfo function to resolve the IP address prior to the Lollipop (Android 5.0). Here, the Java layer is modified to call the android_getaddrinfofornet function after the Lollipop. The POSIX getaddrinfo function in the Android OS is a wrapper function that calls the android_getaddrinfofornet function. Also, the recvfrom function may be hooked because some libraries look up the Domain Name Server (DNS) with their own method instead of using the getaddrinfo function or the gethostbyname function. In this way, the DNS response may be parsed if some data is received from the User Datagram Protocol (UDP) port 53. If the modified recvfrom function receives the DNS response and the hostname and the IP address is parsed, it is going to save this information to the IP-to-hostname table, such as in step (4) of FIG. 5A.

Figure 4:
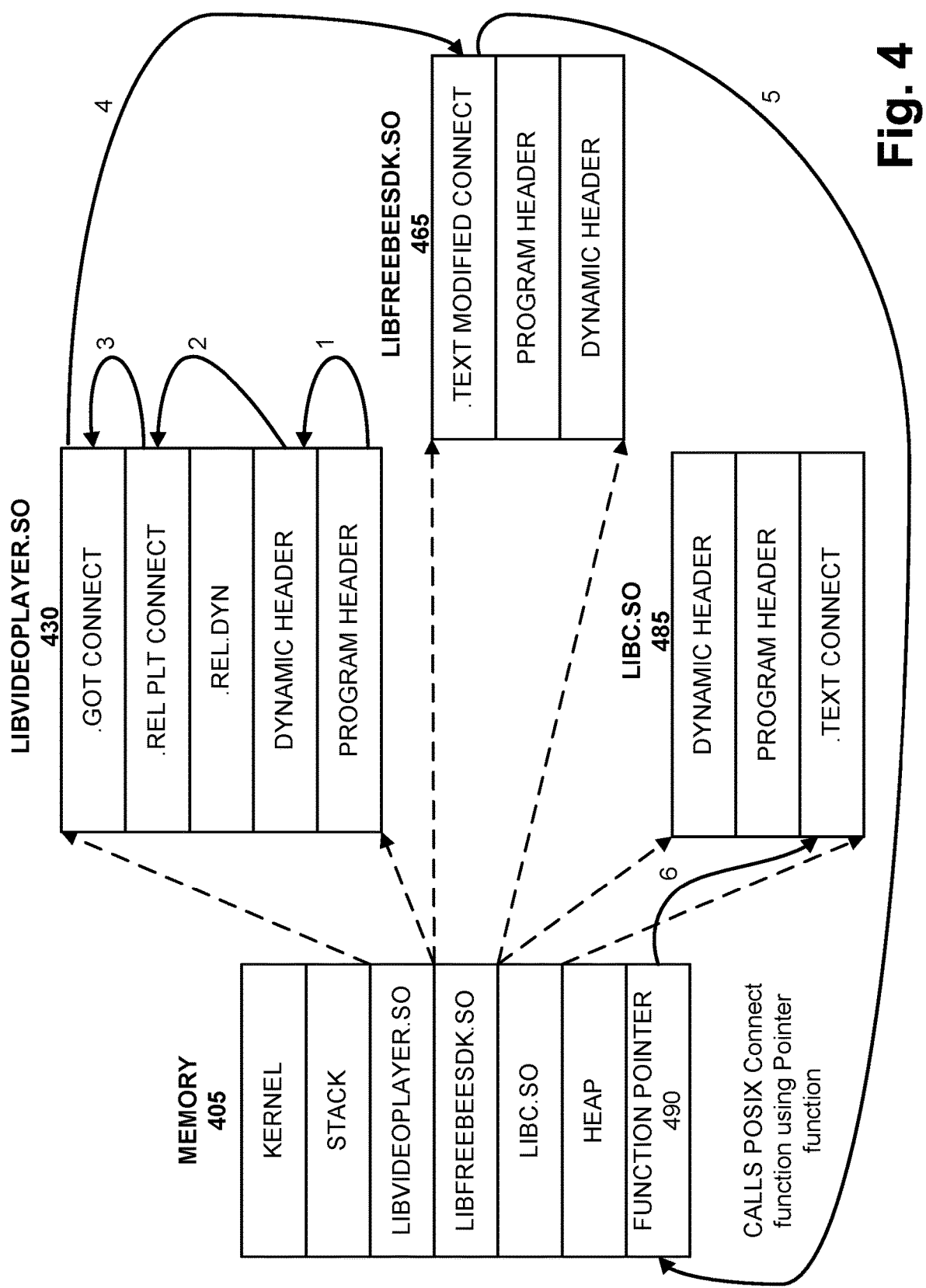
FIG. 4 is a diagram illustrating an exemplary process of the connection service.

FIG. 4 is a diagram illustrating an exemplary process of the connection service. It may be assumed that the connection process illustrated and described in relation to FIGS. 3A and 3B has already been performed. As illustrated, a memory 405 may store, among other data, a libvideoplayer.so 430, a libfreebeesdk.so 465, and a libc.so 485. For example, libvideoplayer.so 430 may pertain to an application, such as a video player. Libfreebeesdk.so 465 may include a library function that supports the connection service, as describe herein. Libc.so 485 may pertain to a libc library. As further illustrated, memory 405 may store a function pointer 490. The instances of data illustrated and described in memory 405, libvideoplayer.so 430, libfreebeesdk.so 465, and libc.so 485 are exemplary. Additionally, the instances of data illustrated and described are not intended to represent all instances of data that may be present.

According to an exemplary scenario, when a connection is initiated via the application, in steps (1), (2), and (3), the application may identify a program header, a dynamic header, and the GOT to locate the address of the connect function (e.g., the POSIX connect function). The address in the GOT indicates the modified connect function of libfreebeesdk.so 465. In step (4), the modified connect function of libfreebeesdk.so 465 is called. In steps (5) and (6), the modified connect function may call the connect function of libc.so 485 via function pointer 490, and an establishment of a connection between the application and the HTTP proxy device may be initiated.

FIGS. 5A-5D are diagrams illustrating another exemplary process of an exemplary embodiment of the connection service. It may be assumed that the connection process illustrated and described in relation to FIGS. 3A and 3B has already been performed. According to an exemplary connection establishment, end device 130 includes an Android OS and uses various functions associated with the connection service, as described herein. For example, as previously described, the SDK may include a library of functions to establish a connection between the end device and an HTTP proxy device, and may generate and transmit an HTTP CONNECT message, which includes a Proxy-Authorization header, to a target device (e.g., an HTTP server or other application layer server) via the HTTP proxy device based on the connection service.

Figure 5A:
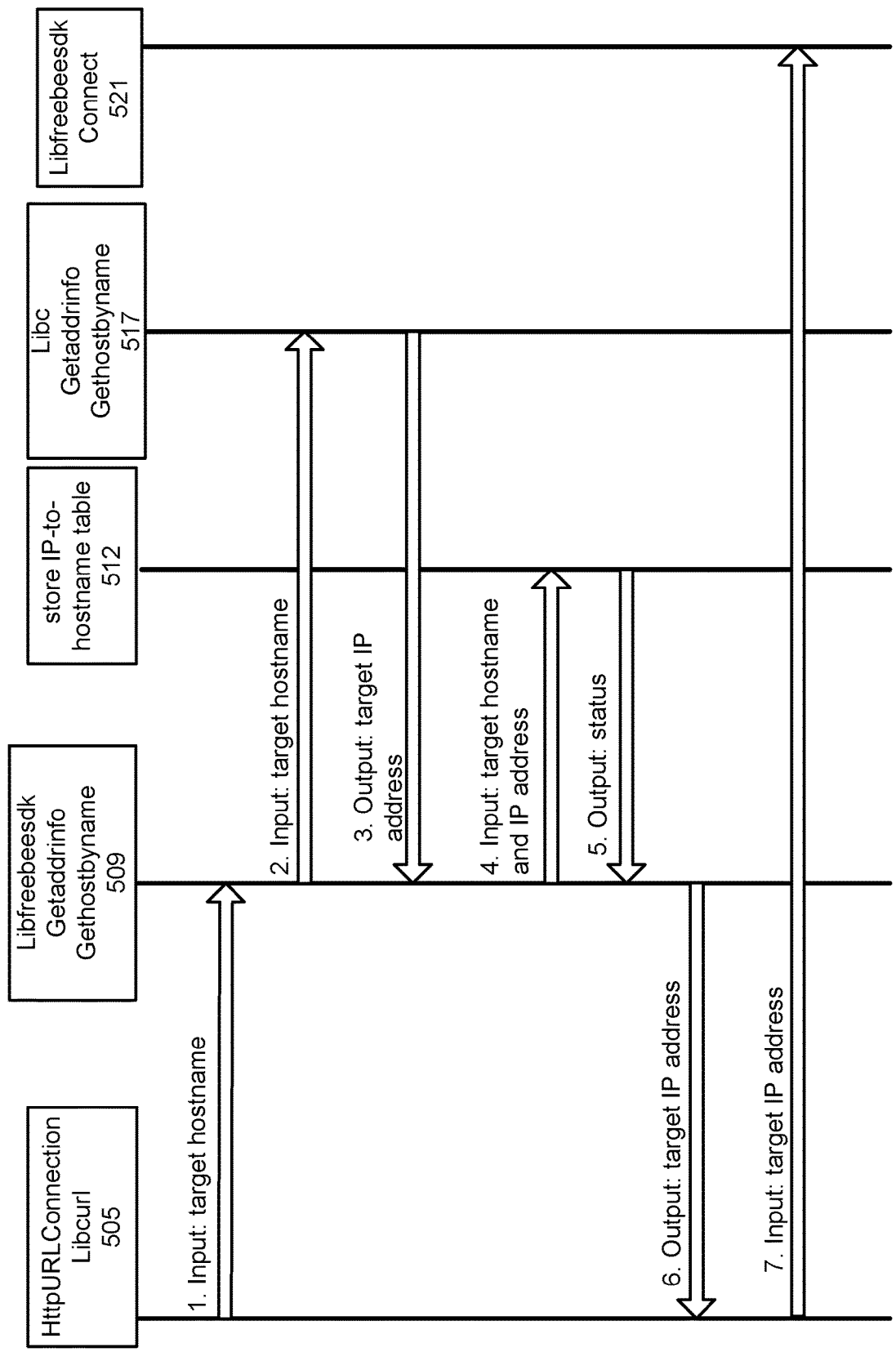

Referring to FIG. 5A, in step (1), an HttpURLConnection class or a Libcurl function 505 may receive an input (e.g., a target hostname) via an application of the end device. For example, the HttpURLConnection class of the Libcurl function may receive the input during the start-up (e.g., initial execution) of the application, or based on a user input, which may occur subsequent to the start-up of the application of the end device. The HttpURLConnection class or the Libcurl function 505 may provide the input (e.g., the target hostname) and may call a Libfreebeesdk, which may be a library of the SDK, as described herein, and includes a getaddrinfo function and a gethostbyname function 509. In step (2), the getaddrinfo function may provide the input (e.g., the target hostname associated with a target device) to the getaddrinfo function of the Libc 517. In step (3), the gethostbyname of the Libfreebeesdk 509 obtains an output (e.g., the target IP address of the target device), which corresponds to the target hostname, from the gethostname of the Libc 517.

In step (4), the Libfreebeesdk 509 provides the target hostname and the target IP address, and calls a store IP-to-hostname table function 512, and in step (5), the store IP-to-hostname function 512 provides an output (e.g., status (e.g., OK, acknowledgement, etc.)) to the Libfreebeesdk 509. In this way, the target hostname and the target IP address of the target device may be stored. In step (6), the Libfreebeesdk 509 may provide an output (e.g., the target IP address) and call the HttpURLConnection class or the Libcurl function 505. In step (7), the HttpURLConnection class or the Libcurl function 505 may provide an input (e.g., the target IP address) and call the Libfreebeesdk, which includes a connect function 521 (e.g., the modified connect function).

Referring to FIG. 5B, in step (8), the modified connect function of Libfreebeesdk 521 may provide an input (e.g., a proxy IP address associated with a proxy device) and call a connect function 523 (e.g., the POSIX connect function) of the Libc via a function pointer (not illustrated), as previously described. The proxy IP address may be saved in the global variable of libfreebeesdk, and is saved when the hooking service is initialized. The proxy IP address might be updated as needed after the initialization, but the modified connect function uses the global variable to provide the proxy IP address to the connect function 523. In response, the connect function 523 may establish a connection with the proxy device (e.g., an HTTP proxy server—not illustrated) based on the proxy IP address, and in step (9) provide an output (e.g., status) to the modified connect function of Libfreebeesdk 521 indicating a success or a failure of the connection. According to this example, it may be assumed that the connection to the proxy device has been established. In step (10), in response to the output, the modified connect function of Libfreebeesdk 521 may provide an input (e.g., the target IP address) and call a load IP-to-hostname table function 525, and in response, in step (11) receives an output (e.g., the target hostname). For example, the load IP-to-hostname table function 525 may retrieve the target hostname based on the target IP address.

In step (12), the modified connect function of Libfreebeesdk 521 may generate an HTTP CONNECT message, which includes, for example, a Uniform Resource Locator (URL) of the target device (e.g., an HTTP server or other type of application layer server), and may provide an input (e.g., the HTTP CONNECT message) and call a send function 527. In step (13), the modified connect function of Libfreebeesdk 521 may receive an output (e.g., status) from the send function 527. For example, the output may indicate that the HTTP CONNECT message has or has not been transmitted. According to this example, it may be assumed that the HTTP CONNECT message is successfully transmitted. In step (14), the modified connect function of Libfreebeesdk 521 may call a receive function 530 so as to receive an HTTP response from the target device, via the proxy device. According to this example, it may be assumed that a connection is established. In step (15), the modified connect function of Libfreebeesdk 521 may receive an output (e.g., the HTTP 200 OK message) when the connection is established with the target device via the proxy device.

Figure 5C:
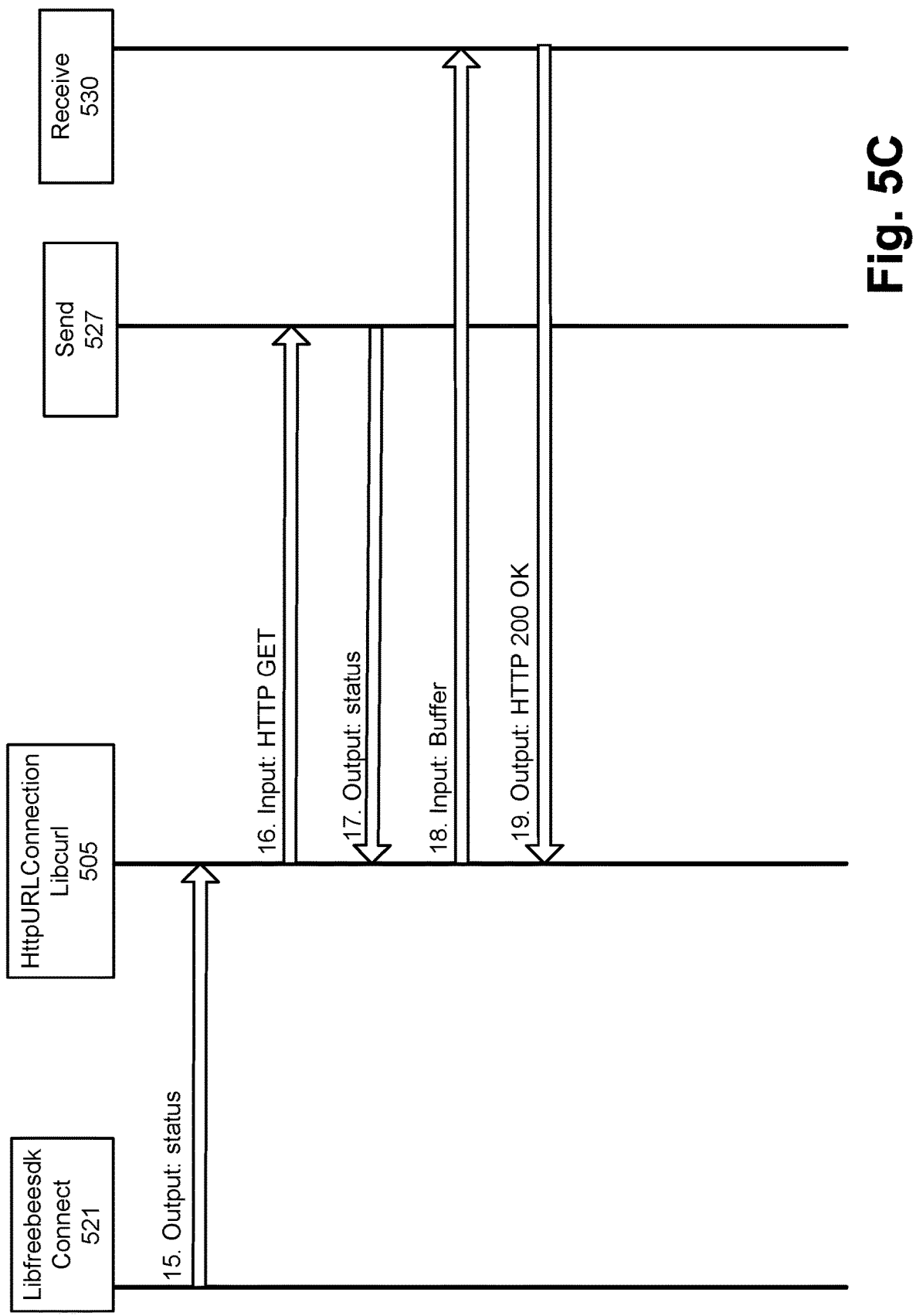

Referring to FIG. 5C, in step (15), the modified connect function of Libfreebeesdk 521 may provide an output (e.g., status) that is responsive to step (7) (e.g., indicating a connection has been established with the target device). In steps (16) and (17), the HttpURLConnection class or the Libcurl function may provide an input (e.g., an HTTP GET message) and call the send function 527 to transmit the HTTP GET message to the target device via the proxy device, and the HttpURLConnection class or the Libcurl function 505 may receive an output (e.g., status). In steps (18) and (19), the HttpURLConnection class or the Libcurl function 505 may provide an input (e.g., buffer) to the receive function 530, so that an HTTP 200 OK message may be received from the target device.

Figure 5D:
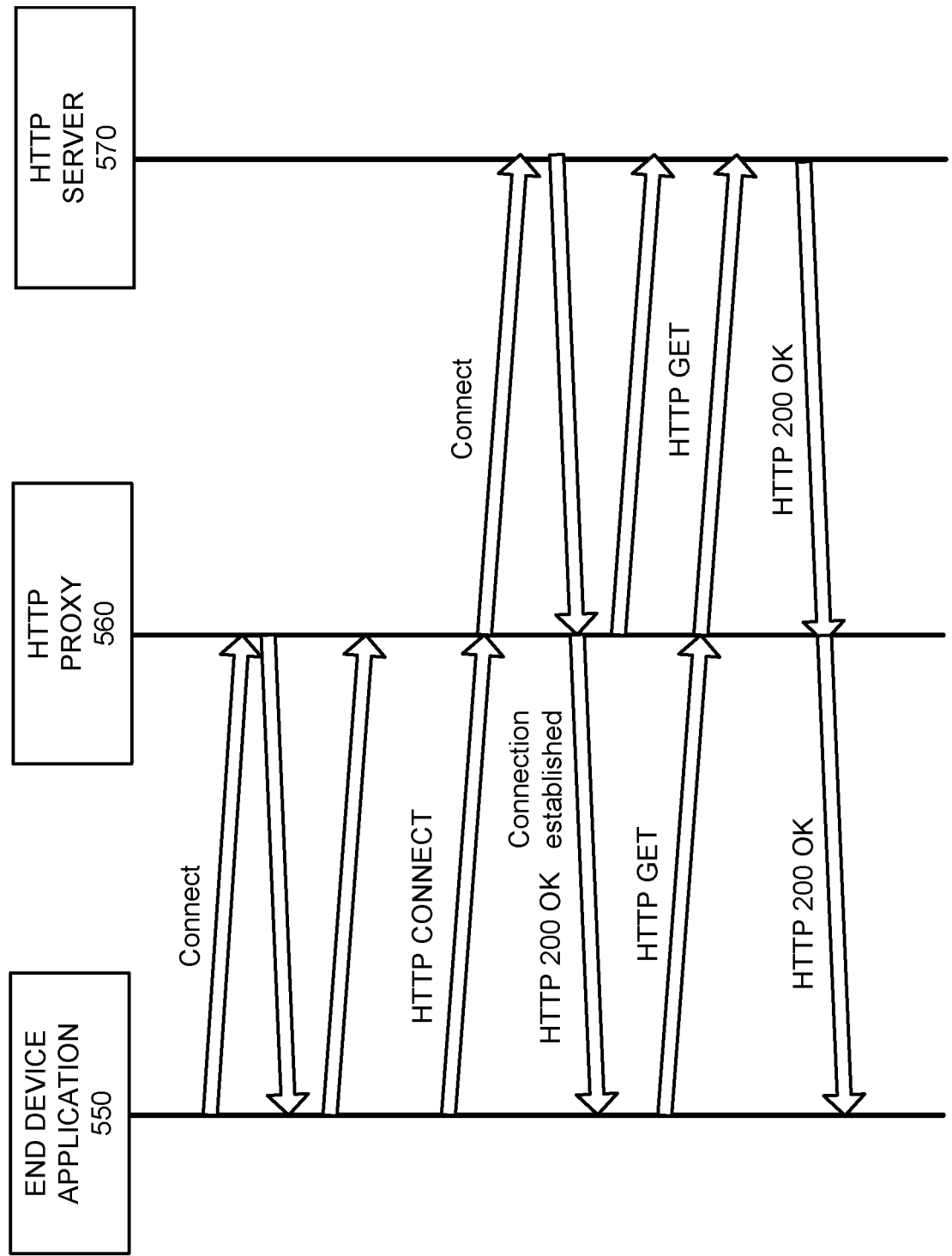

FIG. 5D is a diagram illustrating a portion of the process described in relation to FIGS. 5A-5C. For example, end device application 550, HTTP proxy 560, and HTTP server 570 may exchange messages to establish a connection. As illustrated, a three-way handshake procedure may be performed between end device application 550 and HTTP proxy 560 to establish a connection. Thereafter, end device application 550 may generate and transmit an HTTP CONNECT message to HTTP proxy 560. HTTP proxy 560 and HTTP server 570 may perform a three-way handshake procedure to establish a connection, and an HTTP 200 Connection Established message may be generated and transmitted to end device application 550 from HTTP proxy 560.

End device application 550 may generate and transmit an HTTP GET message to HTTP server 570 via HTTP proxy 560. In response to receiving the HTTP GET message, HTTP server 570 may generate and transmit an HTTP 200 OK message to end device application 550 via HTTP proxy 560.

Although FIGS. 5A-5D illustrate exemplary steps, operations, messaging, etc., according to an exemplary embodiment of the connection service, according to other exemplary embodiments, additional, different, and/or fewer steps, operations, messaging, etc., may be performed. For example, according to another exemplary scenario, end device application 550 may not transmit an HTTP GET message (e.g., in step 16), but another type of HTTP message (e.g., POST, etc.). Alternatively, end device application 550 may not transmit an HTTP message (e.g., in step 16), but may use another application-layer protocol.

FIG. 6 is a diagram illustrating exemplary components of a device 600 that may correspond to one or more of the devices described herein. For example, device 600 may correspond to components included in network device 125 and end device 130. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to end device 130, software 620 may include an SDK, when executed by processor 610, provides the functions of the connection service, as described herein. Similarly, network device 125 may include an application that, when executed by processor 610, provides an HTTP proxy service. Software 620 may also include firmware, middleware, microcode, hardware description language (HDL), and/or other form of instruction. Software 620 may further include an OS (e.g., Windows, Linux, Android, proprietary, etc.). For example, with reference to end device 130, the OS may be the Android OS.

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
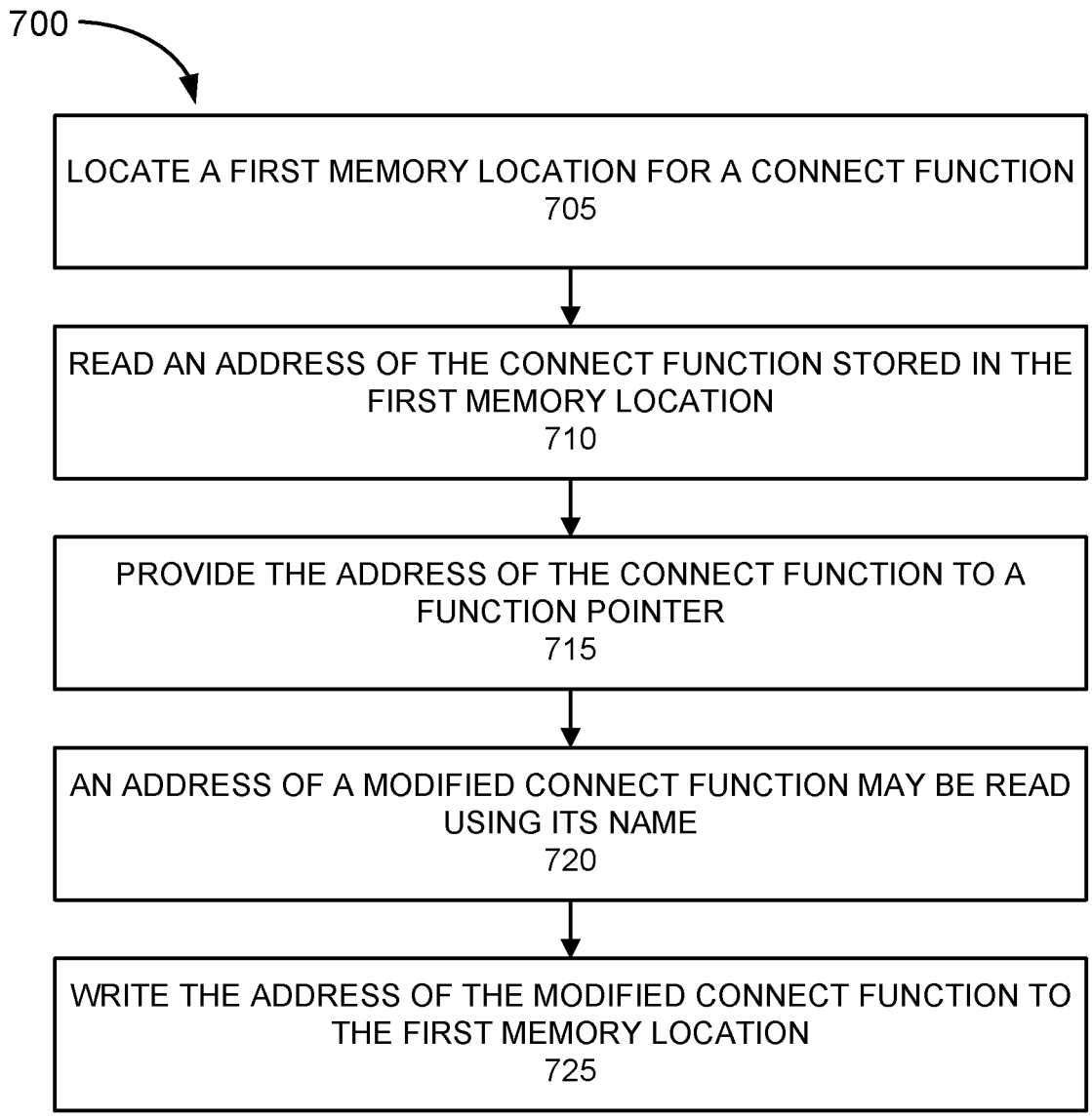
FIG. 7 is a flow diagram illustrating an exemplary process of an exemplary embodiment of the connection service.

FIG. 7 is a flow diagram illustrating an exemplary process 700 of an exemplary embodiment of the connection service. Process 700 is directed to a process previously described with respect to FIGS. 3A and 3B, as well as elsewhere in this description, in which the connection service is provided. According to an exemplary embodiment, end device 130 performs steps of process 700. For example, processor 610 of end device 130 executes software 620 to perform the steps illustrated in FIG. 7, and described herein. According to an exemplary implementation, hook function 300, which is included in a library and is part of the SDK, as described herein, may perform process 700. The hooking service is designed to be invoked at the very beginning of an Android app execution. So the user of the module needs to invoke the initialization function, which calls the hooking service, explicitly in the derivative of Application or Activity class.

Referring to FIG. 7, in block 705, a first memory location for a connect function may be located. For example, hook function 300 may find an entry of GOT that stores the address of the POSIX connect function. As previously described, hook function 300 may read a file (e.g., a maps file from the proc file system) to determine the memory space in which the shared library is stored, and may locate an entry in the GOT, which stores the address of the POSIX connect function, based on another table (e.g., PLT, RT).

In block 710, an address of the connect function may be read from the first memory location. For example, hook function 300 may read the address of the POSIX connect function, which is stored in the entry of the GOT. Hook function 300 may store the address.

In block 715, the address of the connect function may be provided to a function pointer. For example, hook function 300 may provide an input (e.g., the address of the POSIX connect function) and may call the function pointer. The function pointer may store the address of the POSIX connect function.

In block 720, an address of the modified connect function may be read using its name. For example, hook function 300 may read the address of the modified connect function by its name from the Libfreebeesdk (the shared library). By way of further example, the Libfreebeesdk library may include, for example, an assignment statement regarding the address of the modified connect function. A name of a function may be used like an unchangeable function pointer in C. For example, the address of the function may be retrieved based on the following exemplary code:

```
int modified_connect (int fd, const struct sockaddr *address,
    socklen_t address_len)
```

```
{
    //implementation
}
//
    unsigned int address_of_function = modified_connect;
```

In block 725, the address of the modified connect function may be written to the first memory location. For example, hook function 300 may write the address of the modified connect function to the entry of the GOT, which previously stored the address of the POSIX connect function.

Although FIG. 7 illustrates an exemplary process 700 of the connection service, according to other embodiments, process 700 may include additional operations, fewer operations, and/or different operations than those illustrated in FIG. 7, and described herein.

Figure 8A:
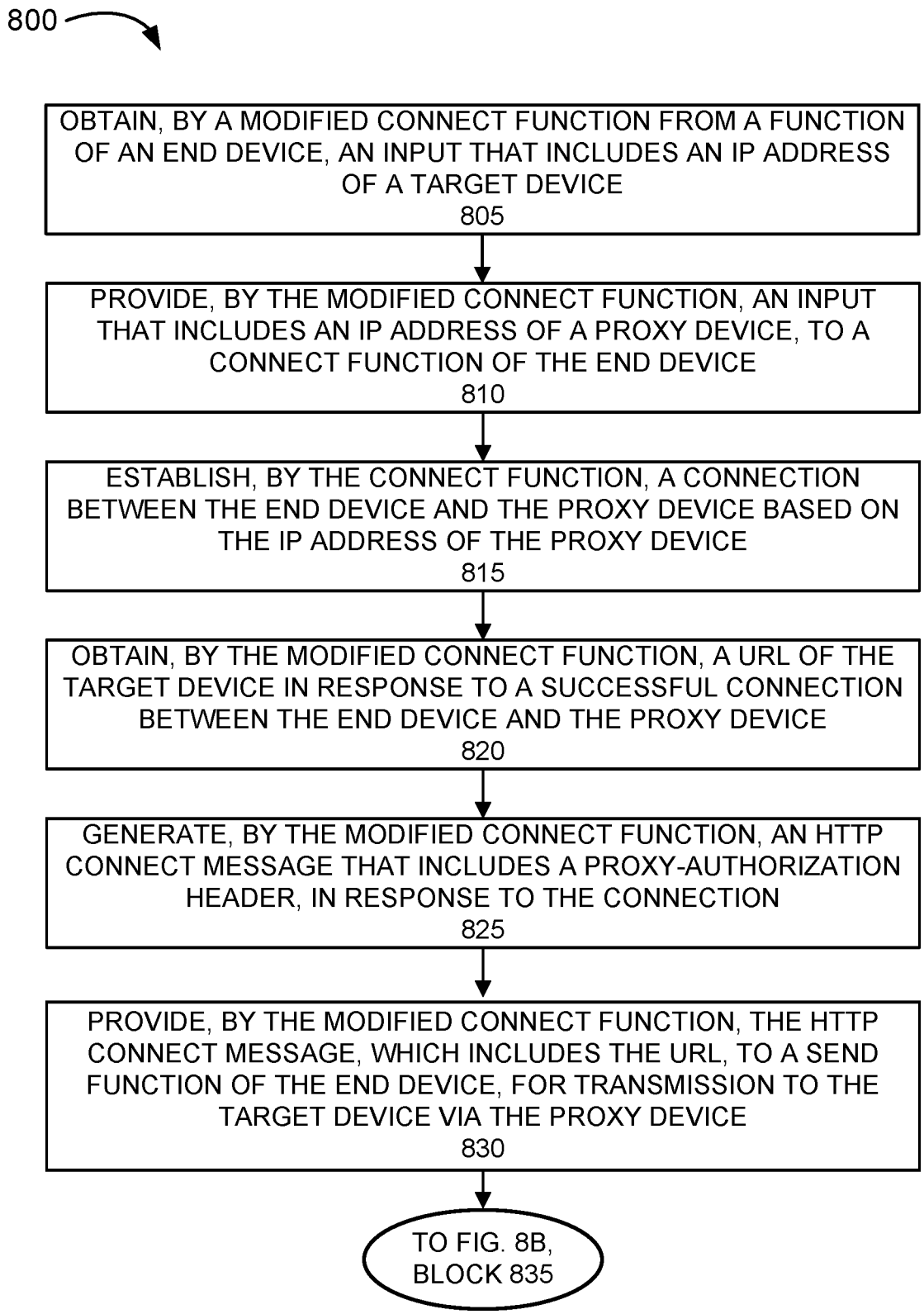
FIGS. 8A and 8B are flow diagrams illustrating another exemplary process of an exemplary embodiment of the connection service.
Figure 8B:
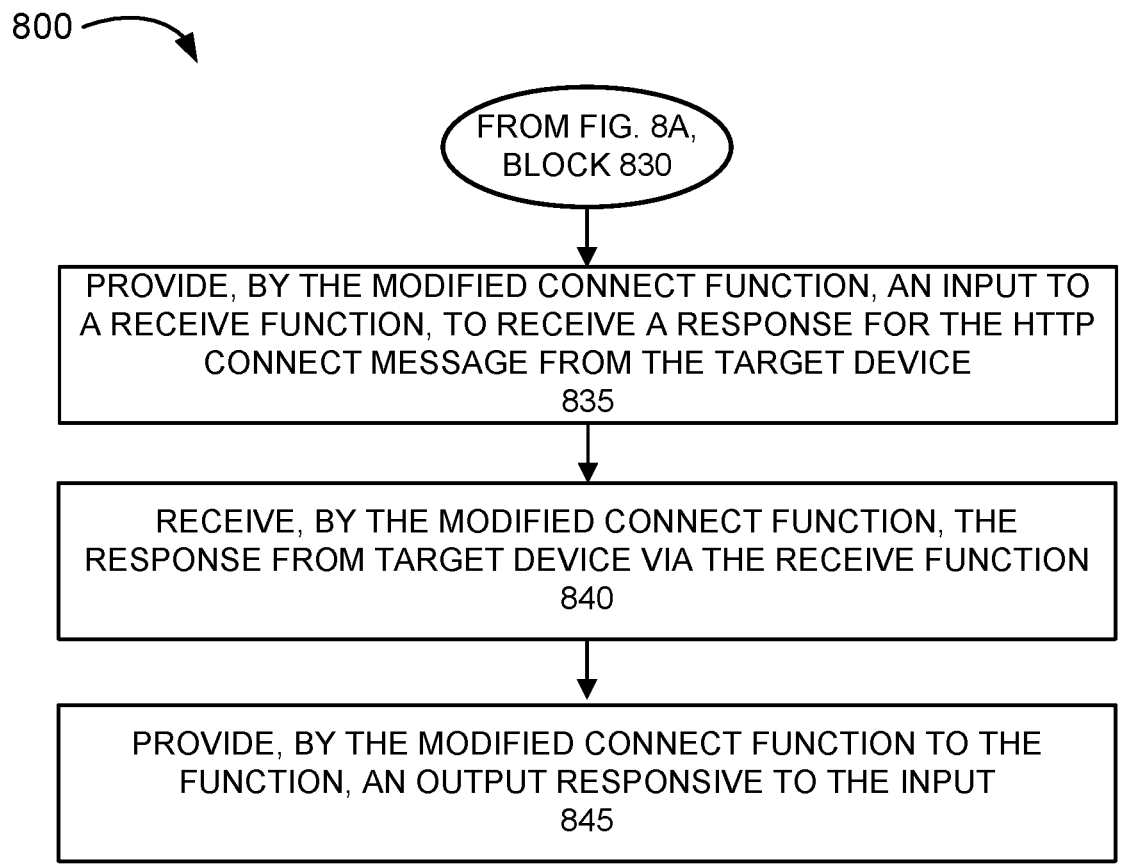

FIGS. 8A and 8B are flow diagrams illustrating an exemplary process 800 of an exemplary embodiment of the connection service. Process 800 is directed to a process previously described with respect to FIGS. 5A-5D, as well as elsewhere in this description, in which the connection service is provided. According to an exemplary embodiment, end device 130 performs steps of process 800. For example, processor 610 of end device 130 executes software 620 to perform the steps illustrated in FIG. 8, and described herein. According to an exemplary implementation, functions included in a library and are part of the SDK, as described herein, may perform operations included in process 800. It may be assumed that the hooking service, as described herein, has already been performed. Additionally, process 800 may be performed subsequent to HTTP proxy settings being stored on the end device.

Referring to FIG. 8A, in block 805, an input that includes an IP address of a target device is obtained by a modified connect function from a function of an end device. For example, the modified connect function may receive an input, which includes the IP address of the target device, from HttpURLConnection or Libcurl.

In block 810, an input that includes an IP address of proxy device is provided by the modified connect function, in response to the input, to a connect function of the end device. For example, the modified connect function may provide an input, which includes the IP address of an HTTP proxy device, to a POSIX connect function via the function pointer.

In block 815, establish a connection between the proxy device and the end device based on the IP address of the proxy device. For example, the POSIX connect function may establish a connection between the end device and the HTTP proxy device using the HTTP. The POSIX connect function may provide an output to the modified connect function indicating the success or failure of the connection. According to this example, the connection is successful.

In block 820, obtain a URL of the target device, by the modified connect function, in response to a successful connection between the end device and the proxy device. For example, the modified connect function may obtain the URL of the target device from a function or a data structure that stores a mapping between the IP address of the target device and the hostname of the target device.

In block 825, an HTTP CONNECT message, which includes a Proxy-Authorization header, is generated, by the modified connect function, in response to the obtainment of the URL of the target device. For example, the modified connect function may generate the HTTP CONNECT message. The HTTP CONNECT message includes a Proxy-Authorization header.

In block 830, the HTTP CONNECT message, which includes the URL, is provided by the modified connect function to a send function of the end device, for transmission to the target device via the proxy device.

Referring to FIG. 8B, in block 835, an input is provided, by the modified connect function to a receive function of the end device, to receive a response for the HTTP CONNECT message from the target device via the proxy device. For example, the input may indicate to buffer or receive the response.

In block 840, the response from the target device is received, by the modified connect function from the target device via the receive function. For example, the receive function may provide an output to the modified connect function, which includes the response.

In block 845, an output is provided, by the modified connect function to the function, that is responsive to the input. For example, the modified connect function may provide the output to the HttpURLConnection or Libcurl. The output may indicate a status regarding the connection with the target device.

Although FIGS. 8A and 8B illustrate an exemplary process of the connection service, according to other embodiments, process 800 may include additional operations, fewer operations, and/or different operations than those illustrated in FIGS. 8A and 8B, and described herein. For example, when a connection or a transmission is not successful, the modified connect function may output to one or multiple functions a failure status.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 7, 8A, and 8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 610) of a computational device. A non-transitory storage medium includes one or more of the storage mediums described in relation to memory/storage 615.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
receiving, by an application of an end device, which uses an Android operating system, a first input indicating to establish a connection with a target device, wherein the application is configured to use a first connect function of a first library;
replacing, by the end device in response to the first input, use of the first connect function with a second connect function of a second library;
establishing, by the end device based on the receiving and the replacing, a connection between the end device and an Hypertext Transfer Protocol (HTTP) proxy device, using HTTP;

generating, by the end device, an HTTP CONNECT message that includes a Proxy-Authorization header and a destination address of the target device, in response to a successful establishment of the connection with the HTTP proxy device;

transmitting, by the end device, the HTTP CONNECT message to the HTTP proxy device which triggers three-way handshaking between the HTTP proxy device and the target device; and receiving, by the end device, a response to the HTTP CONNECT message from the HTTP proxy device.

2. The method of claim 1, wherein the replacing further comprises:

locating, by the end device, a first memory location for a first connect function included in a library used by the application;

reading, by the end device, a first address of the first connect function stored in the first memory location;

providing, by the end device, the first address of the first connect function to a function pointer;

reading, by the end device, a second address of a second connect function by its name; and writing, by the end device, the second address of the second connect function to the first memory location.

3. The method of claim 2, wherein the first connect function is a Portable Operating System Interface (POSIX) connect function.

4. The method of claim 3, wherein the establishing comprises:

calling, in response to receiving the first input, the second connect function based on the second address in the first memory location; and receiving, by the second connect function, a second input that includes an Internet Protocol address of the HTTP proxy device.

5. The method of claim 4, wherein the establishing further comprises:

calling, by the second connect function in response to the calling and the second input, the first connect function via the function pointer, to establish the connection between the end device and the HTTP proxy device, using the HTTP; and providing, by the second connect function to the first connect function via the function pointer, the second input.

6. The method of claim 5, wherein the generating further comprises:

generating, by the second connect function in response to a successful connection between the end device and the HTTP proxy device, the HTTP CONNECT message that includes the Proxy-Authorization header and the destination address of the target device; and calling, by the second connect function, a send function to transmit the HTTP CONNECT message to the target device via the HTTP proxy device.

7. The method of claim 6, further comprising:

obtaining, by the second connect function, a hostname of the target device, and wherein when generating the HTTP CONNECT message, the destination address of the target device includes a Uniform Resource Locator of the target device.

8. The method of claim 6, further comprising:

calling, by the second connect function, a receive function to receive a message, responsive to the HTTP CONNECT message, from the target device.

9. An end device comprising:
a communication interface;
an application and an Android operating system;
a memory, wherein the memory stores instructions; and
a processor, wherein the processor executes the instructions to:

receive, by the application of the end device, a first input indicating to establish a connection with a target device, wherein the application is configured to use a first connect function of a first library;

replace, in response to the first input, use of the first connect function with a second connect function of a second library;

establish, via the communication interface, based on the receipt of the first input and the replacement, a connection between the end device and an Hypertext Transfer Protocol (HTTP) proxy device, using HTTP;

generate an HTTP CONNECT message that includes a Proxy-Authorization header and a destination address of the target device, in response to a successful establishment of the connection with the HTTP proxy device;

transmit, via the communication interface, the HTTP CONNECT message to the target device via the HTTP proxy device; and receive, via the communication interface, a response to the HTTP CONNECT message from the target device via the HTTP proxy device.

10. The end device of claim 9, wherein when replacing, the processor further executes the instructions to:

locate a first memory location for a first connect function included in a library used by the application;

read a first address of the first connect function stored in the first memory location;

provide the first address of the first connect function to a function pointer;

read a second address of a second connect function by its name; and write the second address of the second connect function to the first memory location.

11. The end device of claim 10, wherein the first connect function is a Portable Operating System Interface (POSIX) connect function.

12. The end device of claim 11, wherein, when establishing, the processor further executes the instructions to:

call, in response to receiving the first input, the second connect function based on the second address in the first memory location; and receive, by the second connect function, a second input that includes an Internet Protocol address of the HTTP proxy device.

13. The end device of claim 12, wherein, when establishing, the processor further executes the instructions to:

call, by the second connect function in response to the calling and the second input, the first connect function via the function pointer, to establish the connection between the end device and the HTTP proxy device, using the HTTP; and provide, by the second connect function to the first connect function via the function pointer, the second input.

14. The end device of claim 13, wherein, when generating, the processor further executes the instructions to:

generate, by the second connect function in response to a successful connection between the end device and the HTTP proxy device, the HTTP CONNECT message that includes the Proxy-Authorization header and the destination address of the target device; and call, by the second connect function, a send function to transmit the HTTP CONNECT message to the target device via the HTTP proxy device.

15. The end device of claim 14, wherein the processor further executes the instructions to:

obtain, by the second connect function, a hostname of the target device, and wherein when generating the HTTP CONNECT message, the destination address of the target device includes a Uniform Resource Locator of the target device.

16. A non-transitory, computer-readable storage medium storing instructions executable by a processor of an end device that operates with an Android operating system, which when executed cause the end device to:

receive, by an application of the end device, a first input indicating to establish a connection with a target device, wherein the application is configured to use a first connect function of a first library;

replace, in response to the first input, use of the first connect function with a second connect function of a second library;

establish, based on the receipt of the first input and the replacement, a connection between the end device and an Hypertext Transfer Protocol (HTTP) proxy device, using HTTP;

generate an HTTP CONNECT message that includes a Proxy-Authorization header and a destination address of the target device, in response to a successful establishment of the connection with the HTTP proxy device;

transmit the HTTP CONNECT message to the HTTP proxy device which triggers three-way handshaking between the HTTP proxy device and the target device; and receive a response to the HTTP CONNECT message from the HTTP proxy device.

17. The non-transitory, computer-readable storage medium of claim 16, wherein the instructions to replace further storing instructions executable by the processor of the end device, which when executed cause the end device to:

locate a first memory location for a first connect function included in a library used by the application;

read a first address of the first connect function stored in the first memory location;

provide the first address of the first connect function to a function pointer;

read a second address of a second connect function by its name; and write the second address of the second connect function to the first memory location.

18. The non-transitory, computer-readable storage medium of claim 17, wherein the instructions to establish further include instructions executable by the processor of the end device, which when executed cause the end device to:

call, in response to receiving the first input, the second connect function based on the second address in the first memory location; and receive, by the second connect function, a second input that includes an Internet Protocol address of the HTTP proxy device, wherein the first connect function is a Portable Operating System Interface (POSIX) connect function.

19. The non-transitory, computer-readable storage medium of claim 18, wherein the instructions to establish further include instructions executable by the processor of the end device, which when executed cause the end device to:

call, by the second connect function in response to the calling and the second input, the first connect function via the function pointer, to establish the connection between the end device and the HTTP proxy device, using the HTTP; and provide, by the second connect function to the first connect function via the function pointer, the second input.

20. The non-transitory, computer-readable storage medium of claim 19, wherein the instructions to generate further include instructions executable by the processor of the end device, which when executed cause the end device to:

generate, by the second connect function in response to a successful connection between the end device and the HTTP proxy device, the HTTP CONNECT message that includes the Proxy-Authorization header and the destination address of the target device; and call, by the second connect function, a send function to transmit the HTTP CONNECT message to the target device via the HTTP proxy device.

\* \* \* \* \*